(12) United States Patent
Latrille et al.

(10) Patent No.: US 8,657,035 B2
(45) Date of Patent: Feb. 25, 2014

(54) SYSTEMS AND METHODS FOR PROVIDING WIRELESS POWER TRANSMISSIONS AND TUNING A TRANSMISSION FREQUENCY

(75) Inventors: Federic Latrille, Houston, TX (US); Joachim Sihler, Gloucestershire (GB); Michael A. Montgomery, Sugar Land, TX (US); Raphael Gadot, Houston, TX (US); Julius Kusuma, Somerville, MA (US); Randall P. LeBlanc, Katy, TX (US); Brian E. Boling, Sugar Land, TX (US); Laurent Carteron, Cheltenham (GB); Francois Clouzeau, Cheltenham (GB); Christopher C. Bogath, Cheltenham (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 456 days.

(21) Appl. No.: 12/995,859

(22) PCT Filed: Jun. 2, 2009
(Under 37 CFR 1.47)

(86) PCT No.: PCT/US2009/045901
§ 371 (c)(1),
(2), (4) Date: Apr. 11, 2011

(87) PCT Pub. No.: WO2009/149038
PCT Pub. Date: Dec. 10, 2009

(65) Prior Publication Data
US 2011/0226470 A1 Sep. 22, 2011

Related U.S. Application Data

(60) Provisional application No. 61/059,571, filed on Jun. 6, 2008.

(51) Int. Cl.
*E21B 47/00* (2012.01)
*G01V 3/26* (2006.01)

(52) U.S. Cl.
USPC ............. 175/40; 175/57; 324/335; 340/855.7

(58) Field of Classification Search
USPC .......... 166/250.01, 65.1; 175/46, 320, 40, 57; 324/335, 337; 340/855.8, 855.7
See application file for complete search history.

(56) References Cited

U.S. PATENT DOCUMENTS

| 4,992,787 | A | 2/1991 | Helm |
| 6,188,222 | B1 * | 2/2001 | Seydoux et al. ............... 324/339 |
| 6,392,561 | B1 * | 5/2002 | Davies et al. ............... 340/854.3 |
| 2002/0057210 | A1 * | 5/2002 | Frey et al. .................. 340/854.3 |
| 2003/0058125 | A1 * | 3/2003 | Ciglenec et al. ............ 340/853.1 |
| 2003/0070842 | A1 * | 4/2003 | Bailey et al. .................... 175/24 |
| 2003/0147360 | A1 * | 8/2003 | Nero et al. ..................... 370/314 |
| 2005/0016770 | A1 | 1/2005 | Mayes |

(Continued)

FOREIGN PATENT DOCUMENTS

WO 2006000438 1/2006

*Primary Examiner* — Kenneth L Thompson
(74) *Attorney, Agent, or Firm* — Chadwick A. Sullivan; Brigitte Jeffery Echols

(57) ABSTRACT

A system transmits a wireless power transmission from a bottom hole assembly of a drill string. The system has a downhole component having a wireless power transmitter adapted to wirelessly transmit at least one wireless power transmission and a wireless power receiver adapted to receive the at least one wireless power transmission.

3 Claims, 2 Drawing Sheets

(56) References Cited

U.S. PATENT DOCUMENTS

| | | | |
|---|---|---|---|
| 2005/0087368 A1* | 4/2005 | Boyle et al. | 175/57 |
| 2005/0107079 A1* | 5/2005 | Schultz et al. | 455/422.1 |
| 2006/0022839 A1* | 2/2006 | Hall et al. | 340/853.1 |
| 2006/0254764 A1 | 11/2006 | Zuilekom | |
| 2007/0018848 A1* | 1/2007 | Bottos et al. | 340/854.4 |
| 2007/0029112 A1* | 2/2007 | Li et al. | 175/26 |
| 2007/0188344 A1* | 8/2007 | Hache et al. | 340/853.1 |
| 2008/0033653 A1* | 2/2008 | Pabon et al. | 702/6 |

* cited by examiner

SYSTEMS AND METHODS FOR PROVIDING WIRELESS POWER TRANSMISSIONS AND TUNING A TRANSMISSION FREQUENCY

FIELD OF THE INVENTION

The invention relates to systems and methods for providing wireless power transmissions to downhole components. More specifically, in embodiments, the systems and methods may wirelessly transmit electrical energy from a first downhole component associated with a drill string to a second downhole component associated with a drill string, where the two downhole components are not in wired electrical communication. Moreover, the systems and methods may control and/or adjust a transmission frequency associated with a wireless power transmitter and/or receiver.

BACKGROUND OF THE INVENTION

Traditionally, downhole components, such as tools are provided at a bottom hole assembly of a drill string to collect data concerning an operation of a wellsite, as well as conditions of the wellbore and formation surrounding the wellbore. For example, downhole components may include sensors to measure characteristics of the drill string, a borehole and the formation surrounding the borehole. The downhole components may measure formation characteristics, such as resistivity, porosity, and density. However, the downhole components require electrical energy to operate, collect and transmit the collected data upward to the Earth's surface. Electrical energy is often provided to the downhole components by a power source that is located at, within, or near the bottom hole assembly.

The bottom hole assembly or one of the downhole components may include the power source for generating electrical power, which is typically a battery or a mud turbine generator powered by flow of drilling fluid being pumped from a surface system at the Earth's surface into an interior of a drill string. However, regardless of the type of power source being utilized, a wired electrical connection must be established and maintained between the power source and each downhole component requiring electrical energy.

It is generally known that one or more wired electrical connections must be provided to electrically connect the power source and the downhole components. However, some downhole components are incapable of receiving, establishing and maintaining wired electrical connections with a power source. For example, the power source may not be able to electrically connect to these downhole components or may be unable to provide electrical energy required to operate sensors of these downhole components. Specifically, it is not uncommon for two or more downhole components to be separated by a non-wired downhole component which is not electrically connected to the power source. In such instances, at least two power sources are required—one power source for the downhole components on one side of the non-wired downhole component and a second power source for the downhole components on the opposite side of the non-wired downhole component.

Often, other characteristics or features of the non-wired downhole components and/or power source may prevent the power source from being electrically connected to the non-wired downhole components via one or more wired electrical connections. For example, the location or orientation of the non-wired downhole components with respect to the power source, an electrically-wired downhole component or the bottom hole assembly may prevent the non-wired downhole component from being electrically connected to the power source. Furthermore, the functionality or operations of the non-wired downhole component may not allow for wired electrical connections between the non-wired downhole component and the power source and/or the electrically-connected downhole component.

Thus, establishing and maintaining wired electrical connections between a non-wired downhole component and the power source and/or the electrically-connected downhole component is often very difficult or impossible. Without wired electrical connections between a non-wired downhole component and the power source and/or electrically-connected downhole connect, electrical energy can not be transmitted to the non-wired downhole component. As a result, the non-wired downhole component will not have the necessary electrical energy to operate or function unless an internal power source, such as a battery, turbine or alternator is provided within the non-wired downhole component. However, addition of the internal power source to the non-wired downhole component may be expensive, time consuming and inconvenient. The internal power source of the non-wired downhole component may have a short life span and/or may need to be recharged or replaced after a short duration of operation time. Additionally, the characteristics or features of the non-wired downhole component may prevent incorporation of an internal power source therein.

EMBODIMENTS

Figure 1:
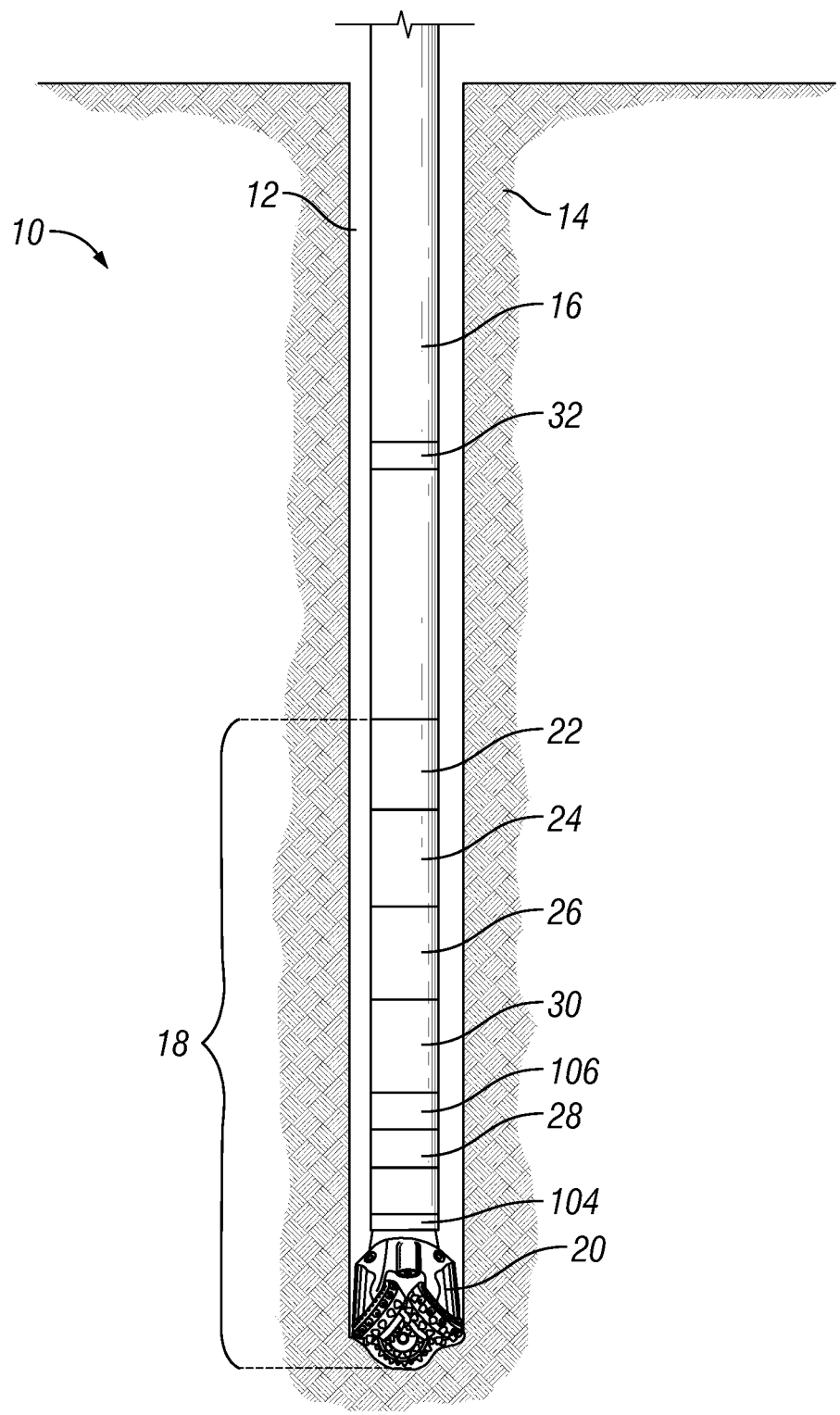
FIG. 1 illustrates a diagram of a system in accordance with embodiments of the present invention and which can be used in practicing embodiments of the method of the present invention.

Referring now to the drawings wherein like numerals refer to like parts, FIG. 1 illustrates a wellsite system 10, which may be onshore or offshore, in which the present systems and methods for providing wireless power and/or data transmissions to downhole components may be employed. A borehole 12 is formed in subsurface formations 14 by rotary drilling in a manner that is well known. Embodiments of the invention may be used with vertical, horizontal and/or directional drilling.

The wellsite system 10 may include a drill string 16 suspended within the borehole 12. The wellsite system 10 is used as an example system in which the invention may be incorporated, but a person having ordinary skill in the art will understand that the invention may be used in any downhole application, such as logging, formation evaluation, drilling, sampling, reservoir testing, completions, or abandonment of the wellbore. A bottom hole assembly 18 and a drill bit 20 may be coupled to a lower end of the drill string 16. Rotation of the drill bit 20 and/or the drillstring 16 may move the drill string 16 through the borehole 12.

The drillstring 16 may include one or more downhole components 22, 24, 26, 28, 30 for measuring characteristics of the borehole 12, the drill bit 20, the drill string 16, and/or the formation surrounding the borehole 12. The one or more of the downhole components 22, 24, 26, 28, 30 may be included in the bottom hole assembly 18. It should be understood that the bottom hole assembly 18 may include any number of downhole components as known to one of ordinary skill in the art. The invention may also be used on or between surface components at a wellsite system, such as the wellsite system 10.

Figure 2:
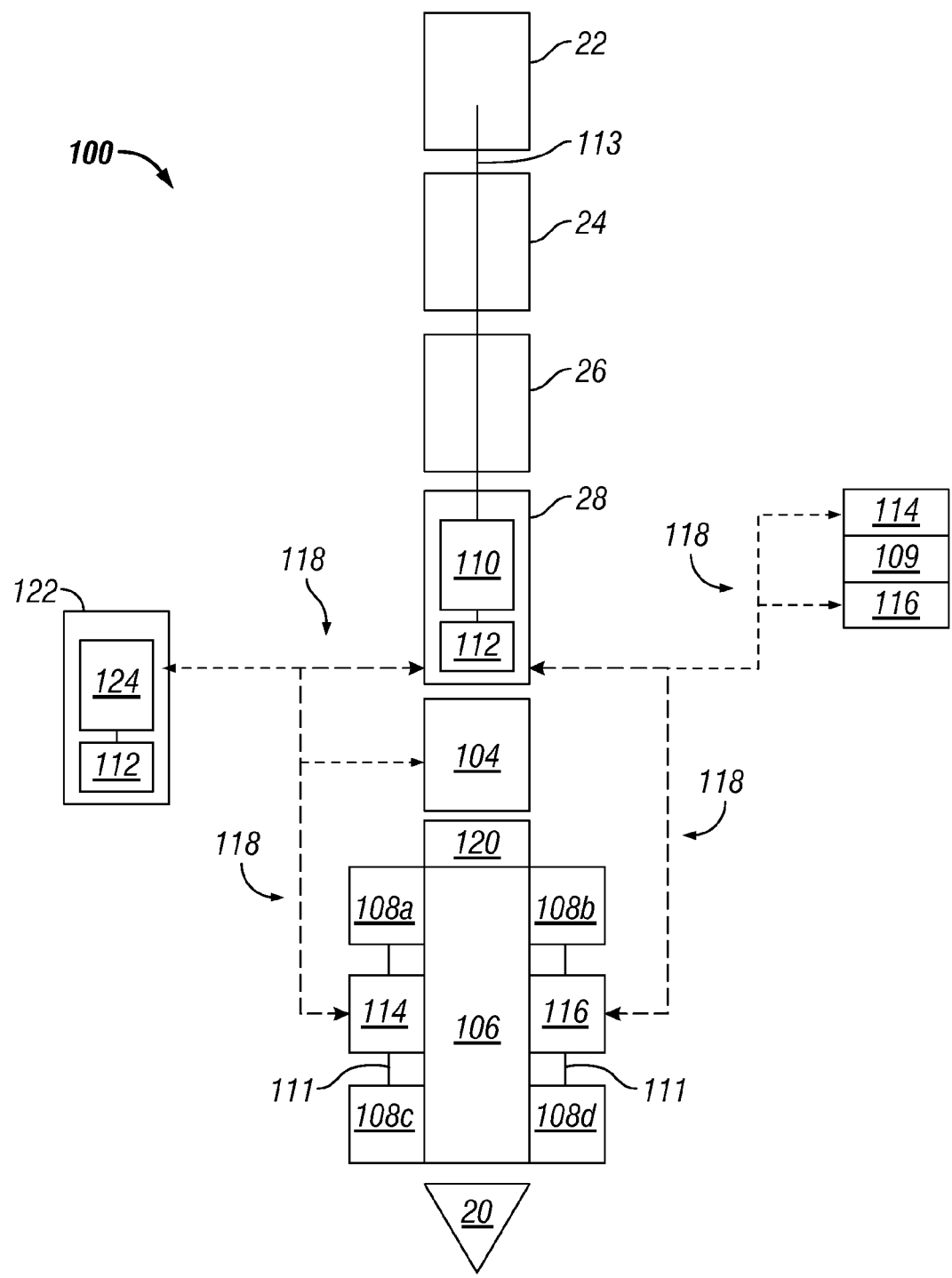
FIG. 2 illustrates a block diagram of a system in accordance with embodiments of the present invention and which can be used in practicing embodiments of the method of the present invention.

FIG. 2 illustrates a block diagram of a drill string 100 which may include the downhole components 22, 24, 26, 28, 30, 104, 106 (hereinafter "the downhole components 22, 106" for simplicity). The one or more downhole components 22, 106 may be a tool, a power source, a tool with a power source, a sensor, or another downhole component of the drill string 100. For example, the one or more downhole components 22, 106, may be tools, sensors, or other devices for measuring a characteristic of the formation, the drillstring 16, and/or the formation surrounding the borehole 12. The one or more downhole components 22, 106 may be one or more devices for forming, maintaining or controlling the borehole 12, such as a motor or a rotary steerable system or other directional drilling system. In another example, the one or more downhole components 22, 106, in embodiments, may be housed in a drill collar, as is known in the art, and may contain one or a plurality of known types of telemetry, survey or measurement tools, such as, logging-while-drilling tools (hereinafter "LWD tools"), measuring-while-drilling tools (hereinafter "MWD tools"), near-bit tools, on-bit tools, and/or wireline configurable tools.

The LWD tools may include capabilities for measuring, processing, and storing information, as well as for communicating with surface equipment. Additionally, the LWD tools may include one or more of the following types of logging devices that measure formation characteristics: a resistivity measuring device; a directional resistivity measuring device; a sonic measuring device; a nuclear measuring device; a nuclear magnetic resonance measuring device; a pressure measuring device; a seismic measuring device; an imaging device; a formation sampling device; a natural gamma ray device; a density and photoelectric index device; a neutron porosity device; and a borehole caliper device. It should be understood that the downhole components 24, 106 may be any LWD tool as known to one or ordinary skill in the skill.

The MWD tools may include one or more devices for measuring characteristics of the drill bit 20, the drill string 16 of FIG. 1 and/or the drill string 100 of FIG. 2. The MWD tools may include one or more of the following types of measuring devices: a weight-on-bit measuring device; a torque measuring device; a vibration measuring device; a shock measuring device; a stick slip measuring device; a direction measuring device; an inclination measuring device; a natural gamma ray device; a directional survey device; a tool face device; a borehole pressure device; and a temperature device. The MWD tools may detect, collect and/or log data and/or information about the conditions at the drill bit 20, around the formation 14, at a front of the drill strings 16, 100 and/or at a distance around the drill strings 16, 100. It should be understood that the downhole components 24, 106 may be any MWD tool as known to one of ordinary skill in the art.

The wireline configurable tool may be a tool commonly conveyed by wireline cable as known to one having ordinary skill in the art. For example, the wireline configurable tool may be a logging tool for sampling or measuring characteristics of the formation 14, such as gamma radiation measurements, nuclear measurements, density measurements, and porosity measurements. In embodiments, the one or more downhole components 22, 106 may be a well completion tool for extracting reservoir fluids after completion of drilling.

In an embodiment, the one or more downhole components 22, 106 may be or may include one or more sensors. For example, the downhole component 106 may include sensors 108*a*-018*d*, 109 as shown in FIG. 2. The one or more sensors 109 may be positioned along the drill string 16, 100. In an embodiment, the one or more sensors 109 may be located remotely with respect drill strings 16, 100. The sensors 108*a*-108*d* and/or the sensor 109 (hereinafter "the sensors 108*a*-108*d*, 109") may be in communication with the bottom hole assembly 18 and/or the one or more downhole components 22, 106. It should be understood that the drill strings 16, 100 and/or the one or more downhole components 22, 106 may include any number of sensors as known to one of ordinary skill in the art.

The one or more sensors 108*a*-108*d*, 109 may detect, collect, log and/or store data concerning the operation of the wellsite 10, the borehole 12, the subsurface formations 14, the drill string 16 and/or the drill bit 20. For example, the one or more sensors 108*a*-108*d*, 109 may be provided to measure parameters such as standpipe pressure, hookload, depth, surface torque, rotary rpm and the like. The one or more sensors 108*a*-108*d*, 109 may detect, collect, log and/or store any data that may be detected, collected, logged and/or stored as known to one of ordinary skill in the art.

In embodiments, the one or more sensors 108*a*-108*d*, 109 may be provided in an interface to measure various wellbore parameters, such as temperature, pressure (standpipe and/or mud), mud flow, noise, vibration and/or drilling mechanics (i.e. torque, weight, acceleration and/or pipe rotation). The one or more sensors 108*a*-108*d*, 109 may also be linked to an analog front end for signal conditioning and/or to a processor for processing and/or analyzing data. The one or more sensors 108*a*-108*d*, 109 may also be used to perform diagnostics. The diagnostics can be used to locate faults in the drill strings 16, 100, measure noise and/or characteristics associated with the drill strings 16, 100 and/or one or more downhole components 22, 106 and perform other diagnostics of the wellsite 10.

The one or more sensors 108*a*-108*d*, 109 may detect, collect and/or log data associated with resistivity of the formation, such as, for example, attenuation and phase shift resistivity at different transmitter spacing and frequencies, resistivity at the drill bit 20 and/or deep directional resistivity. The one or more sensors 108*a*-108*d*, 109 may detect, collect and/or log data associated with formation slowness, such as, for examples, compressional slowness and shear slowness. In addition, the one or more sensors 108*a*-108*d*, 109 may detect, collect and/or log formation images, such as, for example, density borehole images and/or resistivity borehole images. Furthermore, the one or more sensors 108*a*-108*d*, 109 may detect, collect and/or log data associated with formation pressure and/or formation fluid samples. Still further, the one or more sensors 108*a*-108*d*, 109 may detect, collect and log data associated with total gamma rays, spectral gamma rays and/or azimuthal gamma rays. The one or more sensors 108*a*-108*d*, 109 may also detect, collect and/or log data associated with formation caliper, such as, for example, ultra sonic azimuthal caliper and/or density caliper. It should be understood that the data detected, collected, logged and/or stored by the sensors 108*a*-*d*, 109 may be any data as known to one of ordinary skill in the art.

The one or more downhole components 22, 106 may comprise, may include or may incorporate a power source 110 as shown in FIG. 2. The power source 110 may be, for example, a power turbine, a mud turbine generator, a capacitor, a battery or any other power source as known to one of ordinary skill in the art. In embodiments, the one or more downhole components 22, 106 may be the power source 110 itself or the power source 110 may be located and/or connected to the drill strings 16, 100. The present disclosure should not be deemed as limited to a specific embodiment of the power source 110.

The power source 110 may produce and may generate power or electrical energy to be distributed throughout the drill strings 16, 100 and/or to power the one or more downhole components 22, 106.

The present disclosure should not be deemed as limited to a specific embodiment of the tools for the downhole components 22, 106. While the above description sets forth a description of the downhole components 22, 106 with respect to the drill string 16 of FIG. 1 and the drill string 100 of FIG. 2, it should be appreciated by those having ordinary skill in the art that the invention should not be deemed as limited to only drilling applications. It should be understood that the drill string 100 may include any number of downhole components as known to one of ordinary skill in the art.

The drill string 16 of FIG. 1 and/or the drill string 100 of FIG. 2 may include an uphole interface 32 to provide an interface between communications circuitry of a drill string telemetry system and/or the downhole components 22, 106. The drill string telemetry system may comprise one or more of the following telemetry systems: mud pulse telemetry, acoustic telemetry, electromagnetic telemetry, wired drill pipe telemetry, wireline telemetry or any other data transmission methods as known to one of ordinary skill in the art. The present disclosure should not be deemed limited to a specific embodiment of the telemetry utilized drill string telemetry system.

The one or more downhole components 22, 106 may be electrically connected to other downhole components 22, 106 via at least one electrical wire 113 (as shown in FIG. 2) and/or the power source 110. The electrical wire 113 may be, for example, a bus, such as a low power tool bus (hereinafter "the LTB") which may provide inter tool communication and power distribution between one or more downhole components 22, 106.

The power source 110 may transmit or provide electrical energy to one or more downhole components 22, 106 via a wired power transmission over the LTB. As a result, one or more downhole components 22, 106 may receive electrical energy via the wired power transmission from the power source 110. Thus, one or more downhole components 22, 106 may activate and operate from and/or be powered by the electrical energy received from the power source 110 via the wired power transmission.

In an embodiment, one or more downhole components 22, 106 may not be in direct electrical communication with a power source and/or another one of the one or more downhole components 22, 106. For example, the downhole component 106 may be separated from the downhole component 28 by the downhole component 104, which may not be directly wired or in direct electrical communication with one or more downhole components 22, 24, 26, 28, 30. As a result, the downhole component 106 may not be directly wired or in electrical communication with another one of the one or more downhole components 22, 24, 26, 28. For example, the one or more downhole components 22, 106 may not be directly wired via the LTB or an electrical cable capable of transmitting data and/or power or electrical energy.

A first wireless power transmitter and/or receiver 114 (hereinafter "first transmitter/receiver 114") may be in electrical communication with one of the downhole components 22, 106. The first wireless power transmitter/receiver 114 may transmit power to one of the other downhole components 22, 106, such as one of the downhole components 22, 106 that is not in direct electrical communication. A second wireless power transmitter and/or receiver 116 (hereinafter "second transmitter/receiver 116") may be in electrical communication with one of the downhole components 22, 106. The first wireless power transmitter/receiver 114 may transmit and/or may receive electrical power wirelessly from the second wireless power transmitter/receiver 116.

The first transmitter/receiver 114 and/or the second transmitter/receiver 116 (hereinafter "the transmitters/receivers 114, 116") may be housed in or mounted on the one or more downhole components 22, 106. The first transmitter/receiver 114 may be electrically connected to sensors 108a, 108b via an electrical wire 111. The second transmitter/receiver 116 may be electrically connected to sensors 108c, 108d via the electrical wire 111. It should be understood that any number of wireless power transmitters and/or receivers 114, 116 may be provided and electrically connected to any number of the downhole components 22, 106 and/or the sensors 108a-108d, 109 as known to one of ordinary skill in the art.

As illustrated in FIG. 2, the downhole component 28 may comprise, may include and/or may incorporate the power source 110 and/or a wireless power transmitter and/or receiver 112. A wireless power connection 118 may be established, formed and/or maintained between the wireless power transmitter and/or receiver 112, for example, and the one or more of the transmitters/receivers 114, 116. The wireless power connection 118 may electrically connect the power source 110 to at least one of the downhole components 22, 106 via the wireless power transmitter and/or receiver 112 and the transmitters/receivers 114, 116. As a result, the one or more downhole components 22, 106 and/or at least one of the sensors 108a-108d may be provided electrical power via the one or more of the transmitters/receivers 114, 116. In an embodiment, the downhole component 26 and may transmit power wirelessly via the transmitter/receiver 114, 116 from an internal source, such as a battery, to the downhole component 106, which is not in direct electrical communication with the power source 110 or the downhole component 26. In such an embodiment, the downhole component 106 may have an internal battery requiring charging, or may require supplemental power.

In another embodiment, the downhole component 24 may transmit power from the power source 110, which is in direct electrical communication with the downhole component 24, to the downhole component 106. In such an embodiment, the downhole component 24 may receive power from the power source 110 that is in directly electrically connected via the downhole component 26. As a result, this embodiment permits two downhole components 24, 106 to transmit and receive power wirelessly despite the downhole components 24, 106 not being in direct electrical communication (or wired through any of the downhole components 24, 106).

In yet another embodiment, one of the downhole components 22, 106 and/or the power source 110 may transmit power to the sensors 108a-108d, 109. In such an embodiment, the sensors 108a-108d, 109 may be powered without being electrically connected to a power source 110, without having an internal power source and/or without electrical communication to one of the downhole components 22, 106. Further, the at least one wireless power transmission may enable transmission of power and communication over gap collars and/or retrieval of one or more downhole components 22, 106 without requiring disconnection of electrical power and/or communication wires.

Electrical energy in the form of at least one wireless power transmission 118 from the power source 110 may be transmitted between the wireless power transmitter and/or receiver 112 and at least one of the transmitters/receivers 114, 116. In embodiments, data and/or information may be included or embedded within the at least one wireless power transmission 118 between the wireless power transmitter and/or receiver 112 and at least one of the transmitters/receivers 114, 116. As a result, data and/or information may be transmitted or communicated between the wireless power transmitter and/or receiver 112 and at least one of the transmitters/receivers 114, 116 via the at least one wireless power transmission 118. It should be understood that any amount of electrical energy, any number of wireless power transmissions and/or any duration of time for the wireless power transmissions 118 are capable of being produced and/or transmitted by the power source 110 and/or the downhole components 22, 106.

The at least one wireless power transmission 118 may be carried out by the wireless power transmitter and/or receiver 112 and/or the transmitters/receivers 114, 116 by induction, resonant inductive coupling, inductive power transfer, electrodynamic inductive effect, radio wave frequencies, microwave frequencies or transmissions, laser beams and/or evanescent wave coupling, as known in the art. In embodiments, the at least one wireless power transmission 118 may require the wireless power transmitter and/or receiver 112 and/or the transmitters/receivers 114, 116 to be configured and/or arranged in such a way that the transmitters/receivers 114, 116 and the wireless power transmitter and/or receiver 112 are in a line of sight with each other, directly adjacent to each other, and/or in a close proximity to each other.

In embodiments, the at least one wireless power transmission 118 may be based on a strong coupling between electromagnetic resonant objects, such as, the wireless power transmitter and/or receiver 112 and/or the transmitters/receivers 114, 116, to transfer energy wirelessly. The wireless power transmitter and/or receiver 112 and/or the transmitters/receivers 114, 116 may contain one or more magnetic loop antennas critically tuned to the same or substantially the same frequency. As a result of the magnetic loop antennas being tuned to the same or substantially the same frequency, strong-coupled resonances may be achieved between the wireless power transmitter and/or receiver 112 and/or the transmitters/receivers 114, 116 to achieve high power-transmission efficiency between the wireless power transmitter and/or receiver 112 and/or the transmitters/receivers 114, 116. Moreover, transmission of data and information may be embedded into and/or included with the power transmission between the wireless power transmitter and/or receiver 112 and/or the transmitters/receivers 114, 116. In embodiments, the wireless energy transfer technology may be, for example, WiTricity or a wireless resonant energy link, as known in the art.

To improve wireless power transmission between the wireless power transmitter and/or receiver 112 and/or the transmitters/receivers 114, 116 (hereinafter "transmitters/receivers 112, 114, 116"), the transmitters/receivers 112, 114, 116 may require frequency tuning. For example, a frequency associated with the wireless power transmitter and/or receiver 112 may be tuned to and maintained at the same frequency or substantially the same resonant frequency as the frequency associated with the transmitters/receivers 114, 116. External effects, such as, for example, temperature, pressure, shock, vibration, borehole conditions, and other effects may change the resonant frequency of the transmitters/receivers 112, 114, 116. For example, the wireless receiver 112, 114, 116 may have a resonant frequency, and the frequency of the wireless transmitter 112, 114, 116 may be tuned or otherwise changed and/or adjust to approach the resonant frequency or a frequency substantially similar to the resonant frequency. A transmission frequency of the wireless transmitter 112, 114, 116 may be controlled to maintain the power-transmission efficiency associated with the wireless power transmission. Alternatively, the resonant frequency of the receiver 112, 114, 116 may be changed to a transmission frequency of the wireless power transmitter 112, 114, 116. The present disclosure should not be limited to a specific embodiment of the external effects that may change the transmission or resonant frequency.

A control loop may be needed to control and/or maintain the resonant frequency and/or the transmission frequency of the transmitter and/or receivers 112, 114, 116 and one of the transmitters/receivers 112, 114, 116. Because more than one of the external effects may destabilize tuning or change the resonant frequency of the wireless transmitters/receivers 112, 114, 116, a simple feedback loop may not effectively control and/or maintain the transmission or resonant frequency. Thus, a complex frequency control loop may be utilized to control and/or maintain the resonant frequency. The complex frequency control loop may utilize several sources of external information, including, but not limited to, information associated with external effects, such as, frequency, power efficiency, temperature, pressure, vibration, borehole conditions and the like. It should be understood that the external information may be any information associated with any type of external effect that may change the resonant frequency.

In embodiments, the transmitters/receivers 112, 114, 116 may collect and/or log control information associated with the external information and/or the electrical energy or power and/or frequency received from the wireless power transmitter and/or receiver 112. For example, the transmitters/receivers 114, 116 may continuously or periodically transmit the control information to the wireless power transmitter and/or receiver 112 via one or more wireless power transmissions via the wireless power connection. The wireless power transmitter and/or receiver 112 may execute a complex frequency control loop based on the control information received from the transmitters/receivers 114, 116. The wireless power transmitter and/or receiver 112, 114, 116 may transmit data associated with the external information, the control information and/or information related to the power transmission. For example, the wireless power receiver 112, 114, 116 may transmit the data to the wireless power transmitter 112, 114, 116. As a result, the complex frequency control loop may result in an adjustment of the transmission frequency of the wireless power transmitter 112, 114, 116.

In an embodiment, initially the operational transmission and resonant frequencies of the transmitters/receivers 112, 114, 116 may be set or tuned to the same or substantially the same initial frequency. During drilling, one or more of the external effects may cause the operational resonant frequency and/or transmission frequency of the transmitters/receivers 114, 116 to increase or decrease to a different frequency. The one or more of sensors 108a-108d may measure the amount of electrical power and frequency received from wireless power transmitter and/or receiver 112. The transmitters/receivers 114, 116 may transmit the measured amount of electrical power and frequency data and/or information to the wireless power transmitter and/or receiver 112. In embodiments, the transmitters/receivers 114, 116 may data and/or information to the power transmitter and/or receiver 112 via the wireless power connection, a wireless communication connection or any other communication method as known to one of ordinary skill in the art. The one or more downhole components 22, 106 may receive the data and information and may determine that the measured amount of electrical power and frequency is less than optimal or not efficient when compared to the amount of electrical energy and frequency that was sent via the first wireless power transmission. The one or more downhole components 22, 106 may adjust the frequency for a subsequent second wireless power transmission by adjusting the transmission frequency of the wireless power transmitter 112, 114, 116 and/or by adjusting the resonant frequency of the wireless power receiver 112, 114, 116 based on the data and/or information received from the wireless power transmitters/receivers 112, 114, 116. As a result, in an embodiment, the wireless power transmitter and/or receiver 112 may transmit the second wireless power transmission to the transmitters/receivers 114, 116 at the adjusted frequency, which may be closer to the resonant frequency of the wireless power receivers 114, 116.

The one or more sensors 108a-108d may measure the amount of electrical energy and frequency received from the wireless power transmitter 112, 114, 116, and may transmit the data and/or information to the one or more downhole components 22, 106 which may be executing the complex control loop. The one or more downhole components 22, 106 may receive the data and/or information and determine that the transmission frequency of the wireless power transmitter 112 may be optimal and/or requires adjustment. For example, if the wireless power transmission frequency is the same or substantially the same frequency as the resonant frequency of the wireless power receivers 114, 116, then the wireless power transmitter 112 may be maintained. Alternatively, the one or more downhole components 22, 106 may receive the data and/or information and may determine that the measured amount of electrical energy and that the transmission frequency is not yet optimal and/or is not the same frequency as the resonant frequency of the wireless power receivers 114, 116. As a result, the transmission frequency may be adjusted or tuned to a frequency, such as by increasing or decreasing the frequency, until a subsequent measured amount of received electrical energy and/or frequency indicates that the power transmission is optimal and/or that the transmission frequency is the same or substantially similar to the resonant frequency. Thus, the wireless power transmitters 112, 114, 116 may be continuously or periodically tuned to a frequency the same as or substantially the same as the resonant frequency. Of course, a person of ordinary skill in the art will appreciate that the resonant frequency may instead be tuned to the transmission frequency, or the resonant frequency and the transmission frequency may be simultaneously or iteratively tuned together.

If the wireless power transmission 118 is in a form unusable by the downhole component 22, 106 and/or the sensor 108-108d, the wireless power transmitters/receivers 112, 114, 116 may receive the at least one wireless power transmission from another one of the wireless power transmitter and/or receiver 112, 114, 116 and convert the at least one wireless power transmission to a usable form of electrical energy. At least one of the transmitters/receivers 114, 116 may transmit or provide the electrical energy generated and/or produced from the conversion of the at least one wireless power transmission to one or more sensors 108a-108d which may be electrically connected to at least one of the transmitters/receivers 114, 116. As a result, one or more of the sensors 108a-108d may activate and/or operate from and/or may be powered by the electrical energy received from at least one of the transmitters/receivers 114, 116. In embodiments, the one or more downhole components 22, 106 may have a rechargeable battery 120 for storing energy received from the at least one wireless power transmission. The rechargeable battery may be empty, full or partially full prior to receiving the energy received from the at least one wireless power transmission.

The wireless power transmission 118 may be established, formed and/or maintained between, for example, two or more downhole components 22, 106. For example, the wireless power transmission 118 may be established, formed and/or maintained between, for example, the downhole component 28 and the downhole component 104 as shown in FIG. 2. In embodiments, the rechargeable battery of one or more downhole components 22, 106 (not shown in the drawings) may store the electrical energy received over the at least one wireless power transmission 118 in the rechargeable battery. A battery component 122 may be positioned within the bore hole 12 and/or may be adjacent to the bottom hole assembly 18 of FIG. 1 and/or the drill string 100 of FIG. 2. The battery component may include a rechargeable battery 124 and the wireless power transmitter and/or receiver 112 as shown in FIG. 2. Alternatively, the battery component may include the rechargeable battery 124 and transmitters/receivers 114, 116.

A wireless power connection 118 may be established, formed and/or maintained between at least one of the transmitters/receivers 114, 116 of one or more downhole components 22, 106 and the wireless power transmitter and/or receiver 112 of the battery component 122. As a result, one or more downhole components 22, 106 may be electrically connected to the battery component 122 via the wireless power transmitter and/or receiver 112 of the battery component 122, the transmitters/receivers 114, 116 of the one or more downhole components 22, 106 and/or the wireless power connection 118. In embodiments, one the downhole components 22, 106, such as, the downhole component 104 may be electrically connected to the rechargeable battery 124 of the battery component via the wireless power connection and/or the wireless power transmitter and/or receiver 112 of the battery component as shown in FIG. 2.

The one or more sensors 108a-108d, 109 and/or one or more downhole components 22, 106 electrically connected to the battery component 122 may receive the at least one wireless power transmission and may convert the at least one wireless power transmission to electrical energy. As a result, the one or more sensors 108a-108d, 109 and/or the one or more downhole components 22, 106 may activate and/or operate from and/or may be powered by the electrical energy received over the at least one wireless power transmission. Moreover, the rechargeable battery of the one or more downhole components 22, 106 may store the energy received from the at least one wireless power transmission from the battery component 122. The rechargeable battery 124 of the battery component 122 may be emptied or exhausted by transferring energy to the one or more downhole components 22, 106. The battery component 122 may be removed from the borehole 12 for recharging of the rechargeable battery 124 at the Earth's surface via, for example, a power generator or another power recharging source as known to one of ordinary skill in the art. Thus, energy may be directly transmitted from the rechargeable battery 124 of the battery component 122 to one or more rechargeable batteries of one or more downhole components 22, 106.

In embodiments, the one or more sensors 109 may be deployed or positioned in the formation 14, behind a casing (not shown in the drawings), in the casing or at other locations as shown in FIG. 2. The one or more sensors 109 may be electrically connected to at least one of the transmitters/receivers 114, 116. At least one of the transmitters/receivers 114, 116 may establish and maintain a wireless power transmission 118 with the wireless power transmitter and/or receiver 112. As a result, one or more sensors 109 may be electrically connected to the power source 110 of the one or more downhole components 22, 106 via the wireless power connection 118. Electrical energy in the form of at least one wireless power transmission may be transmitted between the at least one of the transmitters/receivers 114, 116 of the one or more sensors 109 and the wireless power transmitter and/or receiver 112 of the one or more downhole components 22, 106 over the wireless power connection 118.

At least one of the transmitters/receivers 114, 116 of the one or more sensors 109 may receive the at least one wireless power transmission 118 and may convert, if necessary, the at least one wireless power transmission to electrical energy. The one or more sensors 109 may activate and/or operate from and/or may be powered by the electrical energy received over the at least one wireless power transmission. In embodiments, a rechargeable battery (not shown in the drawings) may be electrically connected to the one or more sensors 109 for powering the one or more sensors 109 and/or storing the electrical energy received from the at least one wireless power transmission 118.

In embodiments, the data and/or information received over the at least one wireless power transmission 118 may be transmitted and/or provided to the one or more downhole components 22, 106 which may be a telemetry tool for the drill string telemetry system. The one or more downhole components 22, 106 may be electrically connected, in bidirectional operation, via the drill string telemetry system to the uphole interface 32, and/or a control unit (not shown in the drawings). The control unit may be located at or near the Earth's surface or at an uphole location with respect to the bottom hole assembly 18 of FIG. 1 and/or the drill string 100 of FIG. 2. It may be necessary to have a communication link between the one or more downhole components 22, 106 and the control unit to perform one or more of the following functions: receiving and/or sending data, logging information, and/or control information to and/or from the one or more downhole components 22, 106 and surface equipment, performing computations and analyses, and communicating with operators and with remote locations.

The one or more downhole components 22, 106 may produce and/or provide data and/or information received from other downhole components 22, 106 and/or sensors 108a-108d, 109 in the form of at least one communication signal. One or more downhole components 22, 106 may transmit the at least one communication signal of data and/or information to the uphole interface 32 and/or the control unit. As a result, data and/or information detected, collected, logged and/or stored by one or more downhole components 22, 106 may be communicated and/or provided to the uphole interface 32 and/or the control unit.

The uphole interface 32 and the control unit may comprise, may include and/or may incorporate the transmitters/receivers 112, 114, 116 for transmitting and/or receiving electrical energy, data and/or information. A wireless power connection may be established and/or maintained between the uphole interface 32 and the control unit via the transmitters/receivers 112, 114, 116. One or more wireless power transmissions may be transmitted and/or received by the uphole interface 32 and/or the control unit over the wireless power connection. As a result, electrical energy, data and/or information may be communicated between the uphole interface 32 and the control unit via one or more wireless power transmissions 118.

In embodiments, communication signals may be received by the one or more downhole components 22, 106 from the control unit via the bidirectional communication provided by the drill string telemetry system. The communication signals received from the control unit may control processes such as directional drilling and/or functions or operations of one or more downhole components 22, 106. The communication signals from the control unit may be transmitted downhole to the one or more downhole components 22, 106 and/or sensors 108a-108d, 109 via the drill string telemetry system, wireless communication transmissions, the wireless power transmissions and/or the transmitters/receivers 112, 114, 116. As a result, the bidirectional communication may improve measurement and control, during drilling (and pausing and tripping) processes, to achieve improved operation and decision making.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method, comprising:
conveying a drillstring within a borehole extending into a subterranean formation, wherein the drillstring comprises:
　a first component comprising at least one of an electrical power generator and a first battery;
　a first transmitter/receiver electrically coupled to the first component; and
　at least a portion of one of a first logging-while-drilling tool and a first measuring-while-drilling tool operable to measure a characteristic of at least one of the drillstring, the borehole, and the subterranean formation;
operating the first component, while the drillstring is positioned within the borehole, to wirelessly transmit power and first data from the first transmitter/receiver to a second transmitter/receiver of a second component selected from the group consisting of a second logging-while-drilling tool, a second measuring-while-drilling tool, a turbine, and a generator, wherein the second component comprises:
　a second battery electrically coupled to the second transmitter/receiver; and
　at least one sensor adapted to measure a characteristic of at least one of the drillstring, the borehole, and the subterranean formation;
operating the second component, while the drillstring is positioned within the borehole, to wirelessly transmit second data from the second transmitter/receiver to the first transmitter/receiver, wherein the second data relates to an amount of the power received at the second transmitter/receiver from the first transmitter/receiver;
adjusting at least one of a first transmission frequency and a first resonant frequency for operation of the first transmitter/receiver based on a complex frequency control loop;
adjusting at least one of a second transmission frequency and a second resonant frequency for operation of the second transmitter/receiver based on the complex frequency control loop; and
storing energy received via the second transmitter/receiver from the first transmitter/receiver in the second battery;
wherein the complex frequency control loop utilizes data from each of:
　the first transmitter/receiver;
　the second transmitter/receiver; and
　an information source external to the first and second components.

2. The method of claim 1 further comprising:
determining the first resonant frequency based on the power and first data received by the second transmitter/receiver; and determining the second resonant frequency based on the second data received by the first transmitter/receiver.

3. The method of claim 2 wherein:

adjusting at least one of the first transmission frequency and the first resonant frequency comprises adjusting each of the first transmission frequency and the first resonant frequency; and adjusting at least one of the second transmission frequency and the second resonant frequency comprises adjusting each of the second transmission frequency and the second resonant frequency.

* * * * *